Feb. 25, 1964 R. E. BENN ETAL 3,122,680

MINIATURIZED SWITCHING CIRCUIT

Filed Feb. 25, 1960 3 Sheets-Sheet 1

INVENTORS.
ROBERT E. BENN
FREDERICK F. OHNTRUP

BY William E. Cleaver

ATTORNEY

MINIATURIZED SWITCHING CIRCUIT

Filed Feb. 25, 1960 3 Sheets-Sheet 2

INVENTORS.
ROBERT E. BENN
FREDERICK F. OHNTRUP
BY William E. Cleaver
ATTORNEY

MINIATURIZED SWITCHING CIRCUIT

Filed Feb. 25, 1960 3 Sheets-Sheet 3

INVENTORS.
ROBERT E. BENN
FREDERICK F. OHNTRUP
BY
William E. Cleaver
ATTORNEY 3,122,680

MINIATURIZED SWITCHING CIRCUIT

Robert E. Benn, Broomall, and Frederick F. Ohntrup, Plymouth Meeting, Pa., assignors to Burroughs Corporation, Detroit, Mich., a corporation of Michigan Filed Feb. 25, 1960, Ser. No. 10,940
17 Claims. (Cl. 317—101)

This invention relates to switching circuits and more particularly to miniaturized switching circuits.

Miniaturized electronic elements, units and assemblies have found wide-spread application in electronic equipment, especially where such equipment has had to meet stringent design tolerances aimed at an economy of space and weight. For instance, in the design of electronic equipment to be used in aircraft, it is usually requisite that great consideration be given to minimizing the space and weight for such equipment.

One electronic innovation, which has greatly aided the efforts to save space and weight, has been the introduction of diode matrices to replace banks of relays or other signal switching arrangements. In the art at present a diode matrix customarily comprises a base member with rows of pairs of electrical terminals thereon, and further includes diodes selecitvely connected between associated pairs of these terminals. Each electrical terminal of a pair is respectively common connected with other like electrical terminals to provide the normal row and column conductors needed for input and output signal connections. By way of example, a typical diode matrix of the type just described, designed to handle sixteen input signals and provide thirty-two output signals, is mounted on a base member measuring 6 x 9½ inches, and the entire assembly weighs approximately 150 grams. When compared with the banks of relays which would be needed to perform the same signal switching operation which such a diode matrix can accomplish, this matrix represents a substantial saving in space and weight.

The present invention provides an even greater reduction of space and weight for switching circuits, and more particularly for a diode matrix.

It is an object of the present invention to provide an improved miniaturized signal switching circuit.

It is a further object of the present invention to provide a diode matrix switching circuit whose weight is less than 1/10th of the weight of a prior art diode matrix and whose size when compared ot the prior art represents a reduction by more than 400 times.

It is a further object of the present invention to provide a novel method for building a miniaturized diode matrix of the type described in the preceding object.

In accordance with the feature of the present invention there is provided a first unit to be assembled which has input and output circuits printed thereon. This first unit (hereinafter sometimes called "Unit I") provides the vertical electrical conducting paths and provides input signal connections for horizontal electrical conducting paths.

In accordance with another feature of the present invention there is provided a second unit to be assembled (hereinafter sometimes called "Unit II") which includes a plurality of strips of semiconducting material, a first portion of which is donor-type (or N-type) semiconducting material and the remainder of which is acceptor-type (or P-type) semiconducting material. Each of these strips is formed such that mesas, or flat-topped mounds of semiconducting material having individual P-N (or N-P) junctions are available. If the mesas are formed with the acceptor-type material at the flat-topped end then the donor-type material forms a bar which is common connected to each of the mesas, and when the mesas are formed with the donor-type material at the flat-topped end the arrangement is vice versa. These strips are positioned horizontally in registration with respect to the vertical electrical conducting paths of Unit I, such that each junction mesa on a strip engages a different one of the vertical electrical conducting paths and the ends of the strips respectively engage an assigned input signal connection for the horizontal conducting paths described above. When thus positioned together these strips form a second unit to be assembled and provide horizontal electrical conducting paths as well as diode elements connected to the vertical conducting paths.

In accordance with another feature of the present invention the novel steps for building the miniaturized diode matrix comprise (1) fabricating a wafer of semiconducting material into a large area P-N junction device; (2) (preferably) coating the wafer surface with relatively highly conductive material thereby providing a bonding medium to subsequently effect a bond; (3) cutting away portions of the P-type material and the joined N-type material to a depth below the P-N junction, as well as the immediately adjacent conductive coating, leaving flat-topped mounds or junction mesas, each junction mesa having an individual P-N junction and a conductive coating on its end and further leaving wafer end portions of the P-type material; (4) printing vertical conducting paths and connecting means for horizontal conducting paths on a suitable base of Unit I; (5) overlaying the wafer so that the junction mesas engage the vertical printed conducting paths and the wafer end portions engage the connecting means for the horizontal conducting paths; (6) bonding said wafer to said printed circuits; (7) slicing the wafer horizontally to provide horizontal strips each of which has one or more junction mesas with their respective individual P-N junctions and a common bar of N-type material to complete Unit II; and (8) encapsulating both units to reduce atmospheric effect thereon. The term "printed" circuit as used in the art includes etched, milled or routed, and similar conductor patterns.

The foregoing and other objects and features of this invention will be best understood by reference to the following description of an embodiment of the invention taken in conjunction with the accompanying drawings, wherein FIG. 1 is a top plan view of a semiconductor wafer with mesas formed therefrom;

In general the present invention provides a diode matrix which is principally formed by two units assembled together. The first unit has individual printed circuits which serve as the vertical conductors normally found in a diode matrix. The second unit has a plurality of P-N junction semiconductor strips which have had portions of the P-type material and adjacent N-type material cut away to a depth below the P-N junction leaving flat-topped mounds, descriptively referred to through the specification and the claims as junction mesas. Although the mesas could be cut entirely (or only) from P-type material it has been found that if the P-N junctions are formed in each individual mesa there results: a reduction in cross talk; an elimination in spurious transistor action between P-type elements; etc. Each junction mesa provides a P-N junction diode so that each strip further provides a number of diodes having individual P portions and a common N portion. These strips are mounted horizontally across the printed circuits with each mesa of a strip bonded to, or engaged with, a different vertical printed circuit. The strips serve as the horizontal conductors normally found in such a matrix. Accordingly there is provided a miniaturized diode matrix which, for instance, in an embodiment to be described below, provided 148 selectively positioned diodes in a space 11/16 x 3/16 inch, and weighing less than 15 grams.

Figure 1:
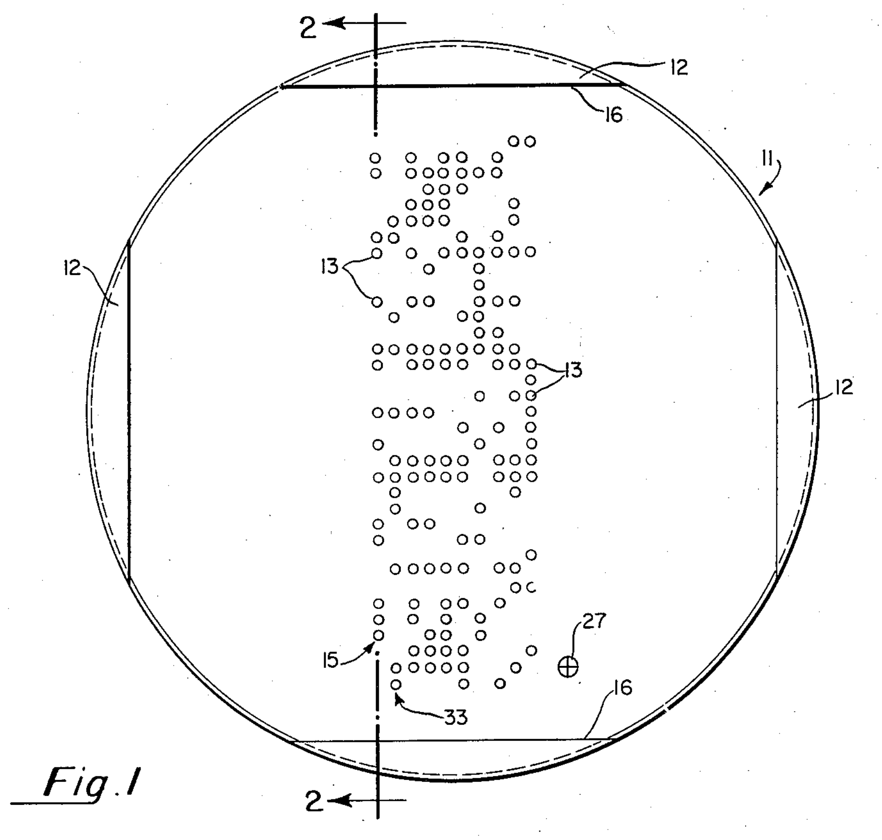
Figure 2:
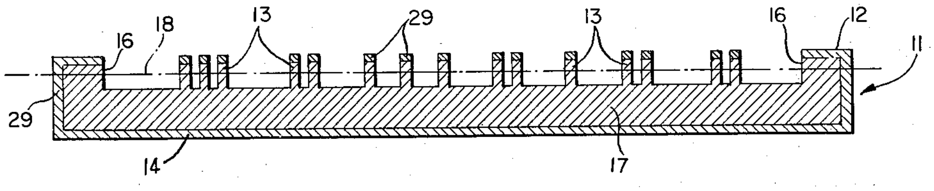
FIG. 2 is a cross-sectional view of the wafer shown in FIG. 1.

Consider FIGS. 1 and 2 of which the former is a top plan view of a wafer 11 of semiconducting material. The wafer 11 shown in FIG. 1 has been machined to form junction mesas 13 each having an individual P-N junction. In a preferred embodiment the wafer 11 was formed by initially having N-type silicon material whose upper half (i.e., the half lying toward the upper surface 12) has diffused therein P-type impurities and whose lower half (lying toward the lower surface 14) has diffused therein N-type impurities. In this preferred embodiment the diffusion of the impurities is accomplished by first depositing P-type impurities such as boron on the upper surface of the wafer and/or depositing N-type impurities such as phosphorus pentoxide on the lower surface of the wafer. It should be understood that many other suitable P-type and N-type impurities are known in the art and may be used. The impurities are deposited on these surfaces by a gaseous deposition technique. Thereafter the wafer 11, with the P-type impurities deposited on its upper surface and/or the N-type impurities deposited on its lower surface, is subjected to heat at approximately 1300 degrees centigrade to diffuse the impurities into the wafer and form P-N junction material. The depth of the junction is dependent upon the amount of heat to which the wafer is subjected. In effect, then, there results a wafer-sized device with a P-N junction of relatively large area. While in a preferred embodiment the material is initially N-type silicon, it is to be understood that any semiconducting material such as germanium could be used and, further, that the initial state of the material might be P-type semiconducting material.

After the wafer-sized P-N junction semiconductor has been produced, the wafer 11 is coated with a silver conducting paint 29 (FIG. 2) as will be more fully described hereinafter. It is to be understood that the inventive circuit is operative without the addition of the silver paint (which merely serves as a convenient bonding medium) and would be operative with another type of conductive coating to serve as a bonding medium. The wafer 11 is then machined ultrasonically to selectively remove portions of the P-type material and the integral or adjacent N-type material to a depth below the P-N junction depicted as dashed line 18. The ultrasonic machining operation can be accomplished by means of a Sheffield ultrasonic cavitron, manufactured by The Sheffield Corp., Dayton, Ohio, or some other suitable ultrasonic machine tool device. After cutting away certain portions of the P-type and N-type materials there remains standing flat-topped mounds, or junction mesas 13, each of which has an end coating of silver paint 29. In addition to the junction mesas which remain, the wafer end portions 16 are likewise left standing. As will become apparent hereniafter, the end portions 16 serve as input signal connecting means.

FIG. 2 is a cross-sectional view cut along the line 2—2 of FIG. 1 showing the junction mesa protrusions 13 which form the bottom row 15 (FIG. 1). Although the lines of mesas in FIG. 1 lie along column positions, they will be referred to as rows since they assume row positions in most of the figures. It can be clearly seen from FIG. 2 how the junction mesas 13 (having individual P-N junctions at level 18) provide a plurality of P-N junction diodes having individual P portions and a common N-type material portion, or bar 17. The junction mesas 13 along row 15 are selectively disposed so that when the mesas engage the printed circuits of Unit I, to be described hereinafter, the diodes can be operated to energize a display means to effect a visual representation such as the numeral "six."

Figure 4:
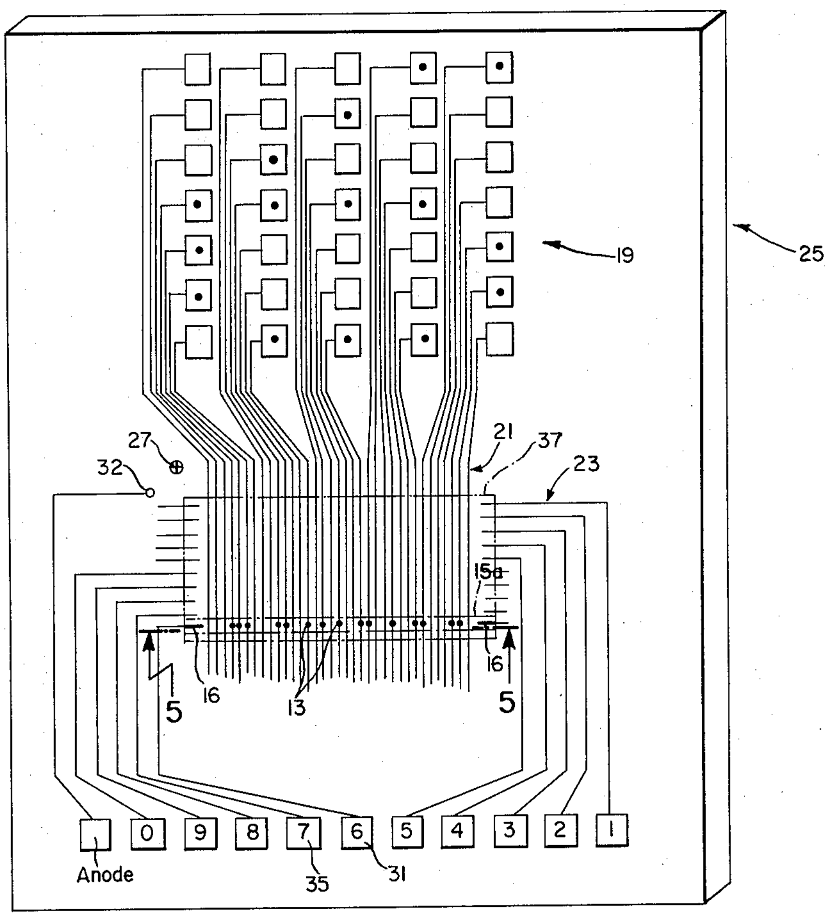
FIG. 4 is a schematic of the printed circuit of Unit I with one strip of Unit II shown in phantom overlaying the circuits of FIG. 1.

Consider now FIG. 4 which represents Unit I. Printed circuit means are shown which are arranged to be used with the display means 19. The vertical conducting paths 21 and the connectors 23 for the horizontal paths are printed with preperations which, by suitable treatment such as heating, produce continuous deposits of conducting material, such as silver, palladium, etc. on some suitable base 25 such as porcelain. A screen printing technique is employed according to a preferred method, but other well-known methods of printing circuits may be used. After the printed circuits have been placed on the base 25, the assembly is "fired" or cured to bond the printed circuits to the base 25.

The wafer 11, whose fabrication has been described above, is then mounted over the vertical conducting paths 21 of Unit I. The rows of junction mesas 13 on the wafer 11, such as row 15, are positioned to run horizontally across the vertical conducting paths 21. A marker 27 which is a circle with an X therein is shown in both FIGS. 1 and 4. If the wafer 11 of FIG. 1 is positioned with the junction mesas 13 coming in contact with the vertical conducting paths 21 so that the markers 27 of FIGS. 1 and 4 engage each other, then the row 15 of FIG. 1 will lie in the position shown in phantom between the dotted lines 15*a* in FIG. 4. The mesas 13 in FIG. 4 are shown lying in registration and selective positions with respect to certain of the vertical conducting paths 21.

After the wafer 11 is positioned in registration with the vertical conducting paths 21 of Unit I the assembly is "fired" or cured to bond the junction mesas 13 and the end portions 16 of wafer 11 respectively to the vertical conducting paths 21 and the horizontal connectors 23.

In other words, the silver coating 29 described earlier and depicted in FIG. 2, is fused with the conducting material of which the printed circuits 21 and 23 are composed. The junction mesas 13 are each bonded to an associated vertical conducting path 21. A single strip, such as strip 15*a*, will have each mesas bonded to a different vertical path although there may be many mesas from different strips bonded to the same vertical path. Mesas which are bonded to the same vertical path will have their common portions electrically isolated from each other when the wafer is sliced, which operation will be described presently.

Figure 3:
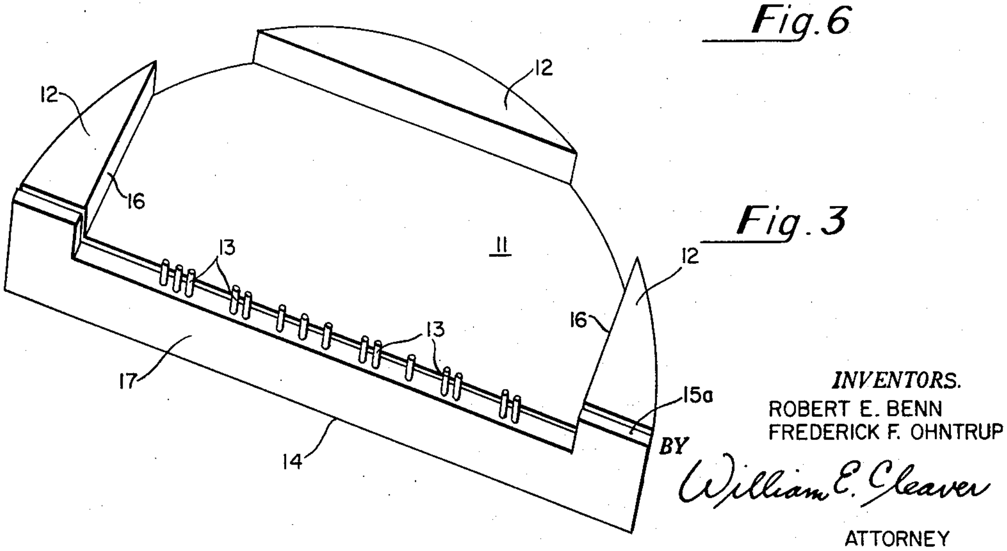
FIG. 3 is a cut-away pictorial representation of the wafer shown in FIGS. 1 and 2.

With the wafer 11 bonded to the printed circuits, such that the surface 14 of FIG. 2 faces outwardly, the assembly is then again subjected to an ultrasonic machining operation. As was previously suggested, the ultrasonic machining operaiton can be accomplished with a Sheffield ultrasonic cavitron, or some other suitable device. In this second machining operation the wafer 11 is sliced between the rows of junction mesas 13, as shown in FIG. 3, to form strips of semiconducting material such as strip 15*a*. These strips are electrically isolated from each other and serve to provide the horizontal electrical conducting paths for the matrix as well as for a plurality of P-N junction diodes. A strip 15*a* is shown positioned in FIG. 4. The strip 15*a*, which bears the mesas of row 15 (FIG. 1), is positioned to engage the vertical conducting paths 21 (FIG. 4) of Unit I so that an input signal to terminal 31 representing the numeral "six" will in fact energize the proper display elements 19 to represent the numeral "six."

Figure 5:
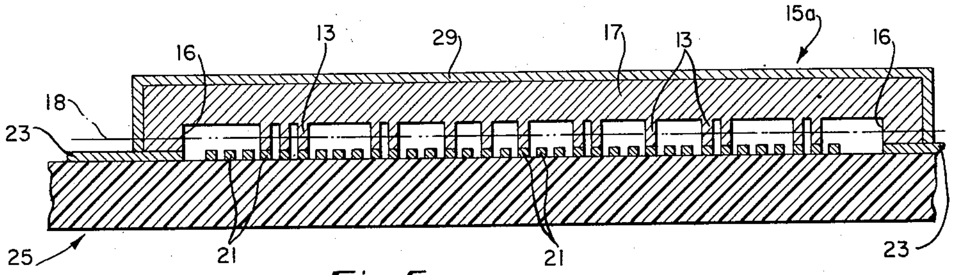
FIG. 5 is a partial sectional view of FIG. 4.

FIG. 5 is a partial sectional view of FIG. 4 cut along the line 5—5 thereof showing the strip 15*a* overlaying the base 25 and engaging certain of the printed circuits 21 and 23. The junction mesas 13, which have the individual P-N junctions are shown having an integral common N-type portion 17. Each of the diodes is selectively engaged with a different one of the printed circuits 21, as is evident in FIG. 4. This selective engagement enables a signal applied to the terminal 31 of FIG. 4 to provide a visual display of the numeral "six," as discussed earlier. The strip 15*a* is bonded to the printed circuits 21 and 23 by means of the bonding medium 29. The dashed line 18 indicates the relative position of the P-N junction level. It should be understood that the height of the mesas and the position of the P-N junction level are not drawn to scale but merely as illustrative.

If the vertical conducting paths 21 which are engaged by the diodes of 15*a* strip (FIG. 4) are traced to their respective terminating points, in the display device 19, it will be found that the elements of the display device 19 which have the black circular dots therein will be the respective terminating points of the paths traced. The black circular dots present a visual representation of the numeral "six." The black circles can be cathode elements of a device which has a common anode connected to point 32 and which is enclosed in neon gas thereby providing an illuminated vertical display of the numeral "six."

If the second row 33 of junction mesas 13 (FIG. 1) were engaged with the vertical conducting paths 21 (FIG. 4) there would be a further connection to the input terminal 35 representing the numeral "seven." If these last-mentioned paths were traced as described above, the numeral "seven" would be visually represented at the terminating elements of the display means 19.

The present inventive diode matrix has been described in connection with a visual display device for purposes of illustration. This inventive diode matrix has great utility with signal switching arrangements, for instance, code converters and the like. The diode matrix itself requires only the space enclosed by the dot-dash line 37 of FIG. 4 which, as stated earlier, in a preferred embodiment is a space of $^{11}\!/_{16}$ x $^{3}\!/_{16}$ inch. The miniaturization of this diode matrix is made possible principally by fabricating a plurality of strips of P-N material in the novel manner described and further, forming a plurality of diodes having individual P-type material portions and a common N-type material portion in the novel manner described earlier.

In a preferred embodiment the entire assembly (the printed circuits with the strips bonded thereto) is potted or encapsulated in suitable material such as glass, epoxy resin, etc., to protect the elements from atmospheric effects. The molten encapsulating compound during the encapsulation finds its way between the layers and strips to fill the voids, for instance, between the mesas.

Figure 6:
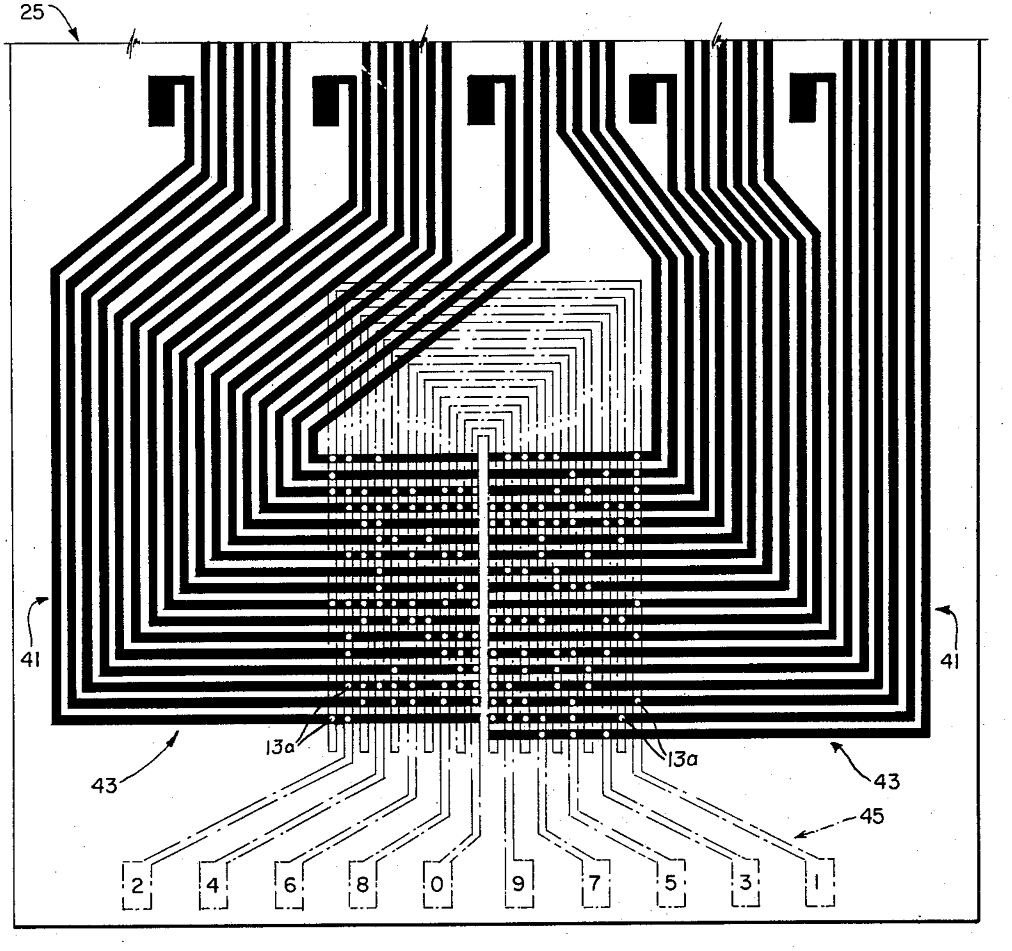
FIG. 6 represents a second embodiment of complete diode matrix.

FIG. 6 is another embodiment of the present invention. The display means, such as means 19 of FIG. 4, are not shown in FIG. 6 but may be identical to means 19, and would be connected to the upper ends of the vertical printed circuit paths 41. In the embodiment shown in FIG. 6, the printed circuits on the base unit are shaped to provide horizontal circuit paths 43. The circuit paths 41 and 43 are printed initially on some suitable base. Thereafter strips of semiconducting material with junction mesas formed therefrom (thereby providing a plurality of diodes), as described above, are positioned in vertical columns across the horizontal circuits 43, as shown by the white circular dots 13*a*. The junction mesas are bonded to the horizontal printed circuits 43 as described earlier, in connection with FIGS. 4 and 5. Second printed circuit means providing vertical circuits 45 with input signal means included, are then individually positioned over the semiconducting strips and bonded thereto to provide the vertical conductors and input signal means necessary to complete the diode matrix. If the input terminals of FIG. 6 are traced out and a display means similar to display means 19 (but inverted) is considered connected to paths 41, it will be found that the proper output lines 41 are responsive to represent the numerals shown at the input signal terminals. Obviously there are other ways of fabricating the unit with different combinations of printed circuits and diode overlays, which fabrication and resultant diode matrices are within the scope of the invention herein described.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A signal switching assembly comprising: first means having a plurality of separate input signal and separate output signal electrical conducting paths, each of said conducting paths electrically isolated from each other; second means having a plurality of strips of semiconducting material each of which strips has a first portion of first type semiconducting material and a second portion of second type semiconducting material, said first type semiconducting material co-acting with said second type semiconducting material across the junction thereof to provide unidirectional current conducting means; each of said strips being formed so that its said first portion provides a bar of first type semiconducting material and its second portion provides one or more junction mesas primarily of second type semiconducting material, said mesas being common connected to said bar and selectively disposed relative to said bar; said second means engaging in registration said first means, such that both (1) each junction mesa of a strip is electrically connected to a different associated one of said output signal electrical conducting paths to form a matrix of unidirectional current conducting devices and (2) each of said bars is electrically connected to a different associated input signal electrical conducting path, thereby enabling a signal which is applied to a certain one of said input signal paths to render responsive selected output signal paths.

2. A signal switching assembly comprising: first means which includes a plurality of input signal printed circuits and a plurality of output signal printed circuits, each of said printed circuits electrically isolated from each other; signal means having a plurality of strips of semiconducting material each of which strips has a first portion of first type semiconducting material and a second portion of second type semiconducting material, said first type semiconducting material co-acting with said second type semiconducting material across the junction thereof to provide unidirectional current conducting means; each of said strips being formed so that its said first portion provides a bar of first type semiconducting material and its second portion provides one or more junction mesas primarily of second type semiconducting material, said mesas being common connected to said bar and selectively disposed relative to said bar; said second means engaging in registration said first means, such that both (1) each junction mesa of a strip is electrically connected to a different associated one of said output signal printed circuits to form a matrix of unidirectional current conducting devices and (2) each of said bars is electrically connected to a different associated input signal printed circuit, thereby enabling a signal which is applied to a certain one of said input signal printed circuits to render responsive selected output signal printed circuits.

3. A signal switching assembly comprising: first means having a plurality of separate input signal and separate output signal electrical conducting paths, each of said conducting paths electrically isolated from each other; second means having a plurality of strips of semiconducting material each of which strips has a first portion of first type semiconducting material and a second portion of second type semiconducting material, said first type semiconducting material co-acting with said second type semiconducting material to provide diode means; each of said strips being formed so that there is provided one or more diodes, each diode having an individual first type semiconducting material portion while having with respect to every other diode on its strip an integral common second type semiconducting material portion, said diodes being selectively disposed relative to said common portion; said second means engaging in registration said first means, such that both (1) each diode of a strip is electrically connected to a different associated one of said output signal electrical conducting paths to form a diode matrix and (2) each of said common connected portions is electrically connected to a different associated input signal conducting path, thereby enabling a signal which is applied to a certain one of said input signal paths to render responsive selected output signal paths.

4. A signal switching assembly comprising: first means which includes a plurality of input signal printed circuits and a plurality of output signal printed circuits, each of said printed circuits electrically isolated from each other; second means having a plurality of strips of semiconducting material each of which strips has a first portion of first type semiconducting material and a second portion of second type semiconducting material, said first type semiconducting material co-acting with said second type semiconducting material to provide diode means; each of said strips being formed so that there is one or more diodes each having an individual first type semiconducting material portion while having with respect to every other diode on its strip an integral common second type semiconducting material portion, said diodes being selectively disposed relative to said common portion; said second means engaging in registration said first means such that both (1) each diode of a strip is electrically connected to a different associated one of said output signal printed circuits to form a diode matrix and (2) each of said common connected portions is electrically connected to different associated input signal printed circuits, thereby enabling a signal which is applied to a certain one of said input printed circuits to render responsive selected output signal printed circuits.

5. A signal switching assembly according to claim 4 wherein said diodes are bonded to their respective associated output signal printed circuits.

6. A signal switching assembly according to claim 4 wherein said first means and said second means are encapsulated for protection against atmospheric effects.

7. A signal switching assembly comprising: a first unit having vertical printed circuits thereon and horizontal input signal connecting circuits printed thereon, each of said printed circuits electrically isolated from the other; a second unit having a plurality of strips of semiconducting material each of which strips has a first portion of acceptor-type semiconducting material and a second portion of donor-type semiconducting material; each of said strips being formed so that there is one or more diodes provided, each diode having an individual acceptor-type semiconducting portion and each being integral with a common donor-type portion, said acceptor-type portions being selectively disposed relative to said common portion; said second unit engaging in registration said first unit such that both (1) each diode is electrically connected to a different associated one of said vertical printed circuits to form a diode matrix and (2) each of said donor-type common portions is electrically connected to a different associated horizontal input signal connecting circuit, thereby enabling a signal which is applied to a certain one of said horizontal input signal connecting circuits to render responsive selected vertical printed circuits.

8. A method for making a miniaturized diode matrix employing a wafer of semiconducting material having one portion of acceptor-type material, a second portion of donor-type material and a base means having vertical printed circuit means thereon comprising the steps of: (1) removing selected portions of said acceptor-type material and adjacent donor-type material from said wafer thereby leaving a plurality of selectively placed mesas, each having an acceptor-donor material junction, standing along horizontal rows; (2) engaging said wafer with said printed circuits so that each junction mesa along a horizontal row engages a different one of said vertical printed circuits; (3) bonding said mesas to said vertical printed circuits; (4) slicing said wafer between the horizontal rows of mesas to form a plurality of strips wherein each strip constitutes an input signal horizontal conducting path and provides one or more diode connections to said printed circuits.

9. A method for making a miniaturized diode matrix comprising the steps of (1) fabricating a wafer of semiconducting material into a wafer-size P-N junction means; (2) cutting away portions of the P-type material and the adjacent N-type material to a depth lower than the P-N junction, leaving flat-topped mounds or junction mesas and wafer end portions; (3) printing vertical conducting paths and connecting means for horizontal conducting paths on a suitable base; (4) engaging said wafer with said printed conducting paths so that the mesas engage the vertical printed conducting paths and the wafer end portions engage the connecting means for the horizontal conducting paths; (5) slicing the wafer horizontally to provide horizontal strips each of which has one or more junction mesas and an integral common bar of N-type material.

10. A method for making a miniaturized diode matrix by combining a Unit I with a Unit II comprising the steps of: (1) fabricating a wafer of semiconducting material into a wafer size P-N junction means; (2) coating the wafer surface with relatively highly electrically conductive material thereby providing a bonding medium to subsequently effect a bond; (3) cutting away portions of the P-type material and the adjacent N-type material, including the conductive coating, leaving flat-topped mounds or junction mesas, each mesa having a conductive coating on its end, and further leaving wafer end portions of the P-type material; (4) printing vertical conducting paths and connecting means for horizontal conducting paths on a suitable base of Unit I; (5) positioning the wafer so that the mesas engage the vertical printed conducting paths and the wafer end portions engage the connecting means for the horizontal conducting paths; (6) bonding said wafer to said printed circuits; (7) slicing the wafer horizontally to provide horizontal strips each of which has one or more junction mesas and an integral common bar of N-type material to complete Unit II and, (8) encapsulating both units to reduce atmospheric effect thereon.

11. A signal switching assembly comprising: first means having a plurality of separate input signal and separate output signal electrical conducting paths, each of said conducting paths electrically isolated from each other; second means having a plurality of strips of semiconducting material each of which strips has a first portion of first type semiconducting material and a second portion of second type semiconducting material, said first type semiconducting material being joined to and co-acting with said second type semiconducting material to provide unidirectional current conducting means; each of said strips being formed so that its said first portion provides a bar of first type semiconducting material and its second portion in combination with said first portion provides one or more individual unidirectional current conducting devices, said individual current conducting devices being integrally and common connected to said bar and selectively disposed relative to said bar; said second means engaging in registration said first means such that both (1) each individual current conducting device of a strip is electrically connected to a different associated one of said output signal electrical conducting paths to form a matrix of unidirectional current conducting devices and (2) each of said bars is electrically connected to a different associated input signal electrical conducting path, thereby enabling a signal which is applied to a certain one of said input signal paths to render responsive selected output signal paths.

12. A signal switching assembly comprising: first means which includes a plurality of input signal printed circuits and a plurality of output signal printed circuits, each of said printed circuits electrically isolated from each other, second means having a plurality of strips of semiconducting material each of which strips has a first portion of first type semiconducting material and a second portion of second type semiconducting material, said first type semiconducting material co-acting with said second type semiconducting material across the junction thereof to provide unidirectional current conducting means; each of said strips being formed so that its said first portion provides a bar of first type semiconducting material and its second portion in combination with said first portion provides one or more junction mesas, said mesas being integral and common connected to said bar and selectively disposed relative to said bar; said second means engaging in registration said first means, such that both (1) each junction mesa of a strip is electrically connected to a different associated one of said output signal printed circuits to form a matrix of unidirectional current conducting devices and (2) each of said bars is electrically connected to a different associated input signal printed circuit, thereby enabling a signal which is applied to a certain one of said input signal printed circuits to render responsive selected output signal printed circuits.

13. A signal switching assembly comprising, in combination, a base member of electrically insulating material having on a surface thereof a plurality of generally parallelly extending electrical conducting paths, each of said paths being electrically insulated from one another, a compact assembly of strips of semiconducting material arranged in parallel but electrically insulated relationship to one another, said strips having one or more protrusions of semiconducting material projecting from the same side of the assembly and forming separate unidirectional current conducting diodes, said diodes being integrally connected to their respective strips and differently disposed thereon, said assembly of semiconducting strips overlying the base member with the strips extending generally crosswise to the generally parallel conducting paths on the base member such that each diode of a strip is electrically connected to a different associated one of the paths to form a diode matrix, and a second plurality of electrically conductive paths on said surface of the base member and connected individually to a different one of said strips for the conduction of current flowing through the diodes.

14. A diode switching matrix assembly comprising, in combination, a member of electrically insulating material having on a surface thereof a plurality of electrically conductive areas each of which are insulated electrically from the other, one or more bodies of semiconducting material, each of said bodies having one or more protrusions of semiconducting material projecting therefrom and forming separate unidirectional current conducting diodes, said diodes being integrally connected to their respective bodies and selectively positioned thereon, means mounting said one or more bodies in overlying relation to said surface of the member and over the conductive areas thereof such that each diode of a body is electrically connected to a different associated conductive area on the member, and an electrical connection individual to each of said one or more bodies for the conduction of current flowing through the diodes.

15. A semiconductor device comprising an elongated bar of one type semiconductor material having a plurality of irregularly spaced areas protruding from one surface of said bar forming a row along the longitudinal axis, said protrusions having a width less than the width of said bar and composed of the same type semiconductor material, semiconductor material of another type in rectifying contact with the end of each said protrusion forming a plurality of rectifying elements.

16. The combination defined in claim 15 wherein the said protrusions on said bar are irregularly dispersed but according to a pattern whereby said rectifying elements may be electrically connected to form a matrix.

17. The combination defined in claim 15 wherein the said protrusions on said bar are irregularly dispersed but according to a pattern whereby straight-line electrical connections may be made thereto to couple said rectifying elements together as a diode matrix.

References Cited in the file of this patent

UNITED STATES PATENTS

| | | |
|---|---|---|
| 2,666,814 | Shockley | Jan. 19, 1954 |
| 2,820,841 | Carlson | Jan. 21, 1958 |
| 2,879,458 | Schubert | Mar. 24, 1959 |
| 2,902,628 | Leno | Sept. 1, 1959 |
| 2,930,950 | Teszner | Mar. 29, 1960 |
| 2,943,312 | Kummer | June 28, 1960 |
| 3,020,412 | Byczkowski | Feb. 6, 1962 |